(12) United States Patent
Borrey et al.

(10) Patent No.: US 8,804,178 B2
(45) Date of Patent: Aug. 12, 2014

(54) SYSTEMS AND METHODS FOR ROUTING A FACSIMILE CONFIRMATION BASED ON CONTENT

(71) Applicant: Kofax, Inc., Irvine, CA (US)

(72) Inventors: Roland G. Borrey, Anaheim (CA); Roy Couchman, Anaheim (CA)

(73) Assignee: Kofax, Inc., Irvine, CA (US)

( * ) Notice: Subject to any disclaimer, the term of this patent is extended or adjusted under 35 U.S.C. 154(b) by 0 days.

(21) Appl. No.: 13/776,541

(22) Filed: Feb. 25, 2013

(65) Prior Publication Data

US 2013/0169999 A1 Jul. 4, 2013

Related U.S. Application Data

(63) Continuation of application No. 11/743,112, filed on May 1, 2007, now Pat. No. 8,451,475.

(51) Int. Cl.
*G06F 3/12* (2006.01)

(52) U.S. Cl.
USPC ......... 358/1.15; 358/1.1; 358/1.13; 358/1.14; 358/438; 358/462; 358/474; 382/140; 382/312; 382/317; 382/321; 704/2; 704/9; 704/251; 704/238; 370/351; 370/355; 370/390

(58) Field of Classification Search
None
See application file for complete search history.

(56) References Cited

U.S. PATENT DOCUMENTS

| | | | |
|---|---|---|---|
| 4,839,853 A | 6/1989 | Deerwester et al. | |
| 5,091,790 A | 2/1992 | Silverberg | |
| 5,159,667 A * | 10/1992 | Borrey et al. | 715/205 |
| 5,175,684 A | 12/1992 | Chong | |
| 5,227,893 A | 7/1993 | Ett | |
| 5,247,591 A | 9/1993 | Baran | |
| 5,287,199 A | 2/1994 | Zoccolillo | |
| 5,404,231 A | 4/1995 | Bloomfield | |
| 5,461,488 A * | 10/1995 | Witek | 358/402 |
| 5,497,319 A | 3/1996 | Chong et al. | |
| 5,535,120 A | 7/1996 | Chong et al. | |
| 5,577,028 A | 11/1996 | Chugo et al. | |
| 5,642,435 A | 6/1997 | Loris | |
| 5,721,826 A | 2/1998 | Gerson et al. | |
| 5,761,415 A | 6/1998 | Joseph et al. | |
| 5,838,461 A | 11/1998 | Hsieh | |
| 5,917,615 A | 6/1999 | Reifman et al. | |
| 6,104,500 A * | 8/2000 | Alam et al. | 358/1.15 |
| 6,310,942 B1 | 10/2001 | Bashoura et al. | |
| 6,477,243 B1 | 11/2002 | Choksi et al. | |
| 6,532,452 B1 | 3/2003 | Pintsov et al. | |
| 6,594,351 B1 | 7/2003 | Bhogal et al. | |
| 6,650,440 B1 | 11/2003 | Wing | |
| 6,700,674 B1 | 3/2004 | Otsuka et al. | |

(Continued)

OTHER PUBLICATIONS

Non-Final Office Action from U.S. Appl. No. 11/743,110 dated Nov. 12, 2010.
Final Office Action from U.S. Appl. No. 11/743,110 dated Apr. 29, 2011.
Non-Final Office Action from U.S. Appl. No. 11/743,110 dated Dec. 12, 2011.

(Continued)

*Primary Examiner* — Miya J Cato
(74) *Attorney, Agent, or Firm* — Zilka-Kotab, PC (57) ABSTRACT

A method for routing a confirmation of receipt of a facsimile or portion thereof according to one embodiment of the present invention includes analyzing text of a facsimile for at least one of a meaning and a context of the text; and routing one or more confirmations to one or more destinations based on the analysis.

29 Claims, 6 Drawing Sheets

(56) References Cited

U.S. PATENT DOCUMENTS

| | | |
|---|---|---|
| 6,744,761 B1 | 6/2004 | Neumann et al. |
| 6,769,016 B2 | 7/2004 | Rothwell et al. |
| 6,804,336 B2 | 10/2004 | Chiu |
| 6,823,367 B1 | 11/2004 | Wakasugi et al. |
| 6,856,432 B2 | 2/2005 | Bobrow et al. |
| 6,906,817 B1 | 6/2005 | Berard et al. |
| 6,963,929 B1 | 11/2005 | Lee |
| 6,980,331 B1 | 12/2005 | Mooney et al. |
| 7,003,497 B2 | 2/2006 | Maes |
| 8,279,465 B2 | 10/2012 | Couchman |
| 8,451,475 B2 | 5/2013 | Couchman |
| 8,593,673 B2 | 11/2013 | Couchman |
| 8,599,419 B2 | 12/2013 | Couchman |
| 2002/0051221 A1 | 5/2002 | Wakabayashi |
| 2002/0071136 A1 | 6/2002 | Bobrow et al. |
| 2003/0002068 A1 | 1/2003 | Constantin et al. |
| 2003/0086124 A1 | 5/2003 | Parry |
| 2003/0117665 A1 | 6/2003 | Eguchi et al. |
| 2003/0117666 A1 | 6/2003 | Eguchi et al. |
| 2003/0133550 A1 | 7/2003 | Mazor et al. |
| 2003/0164990 A1 | 9/2003 | Watanabe |
| 2004/0125396 A1 | 7/2004 | Burke |
| 2004/0174559 A1 | 9/2004 | Mori |
| 2004/0252349 A1 | 12/2004 | Green et al. |
| 2005/0125402 A1 | 6/2005 | Viola et al. |
| 2005/0228996 A1 | 10/2005 | Mayer |
| 2005/0278533 A1 | 12/2005 | Mayer |
| 2006/0010217 A1 | 1/2006 | Sood |
| 2006/0010218 A1 | 1/2006 | Turcotte, II |
| 2006/0126101 A1 | 6/2006 | Shutt et al. |
| 2006/0230004 A1 | 10/2006 | Handley |
| 2007/0013960 A9 | 1/2007 | Gordon et al. |
| 2007/0022060 A1 | 1/2007 | Fitzsimmons |
| 2007/0086061 A1 | 4/2007 | Robbins |
| 2007/0229889 A1* | 10/2007 | Henry et al. ............ 358/1.15 |
| 2008/0273220 A1 | 11/2008 | Couchman |
| 2008/0273221 A1 | 11/2008 | Couchman |
| 2011/0032578 A1 | 2/2011 | Couchman |
| 2012/0320422 A1 | 12/2012 | Couchman |

OTHER PUBLICATIONS

Notice of Allowance and Fee(s) Due from U.S. Appl. No. 11/743,110 dated Jun. 6, 2012.
Non-Final Office Action from U.S. Appl. No. 13/600,148 dated Jan. 4, 2013.
Restriction/Election Requirement from U.S. Appl. No. 11/743,112 dated Oct. 14, 2010.
Non-Final Office Action from U.S. Appl. No. 11/743,112 dated Dec. 27, 2010.
Final Office Action from U.S. Appl. No. 11/743,112 dated Jun. 7, 2011.
Non-Final Office Action from U.S. Appl. No. 11/743,112 dated Jan. 3, 2012.
Non-Final Office Action from U.S. Appl. No. 11/743,112 dated Jun. 14, 2012.
Notice of Allowance and Fee(s) Due from U.S. Appl. No. 11/743,112 dated Nov. 26, 2012.
Non-Final Office Action from U.S. Appl. No. 12/908,821 dated Jan. 6, 2011.
Final Office Action from U.S. Appl. No. 12/908,821 dated Jul. 11, 2011.
Non-Final Office Action from U.S. Appl. No. 12/908,821 dated Jun. 7, 2012.
Final Office Action from U.S. Appl. No. 12/908,821 dated Dec. 7, 2012.
"DeliveryWare Solutions: Esker and Esker DeliveryWare Overview," Esker Software 2003.
U.S. Appl. No. 14/059,325, filed Oct. 21, 2013.
Non-Final Office Action from U.S. Appl. No. 14/054,765 dated Dec. 6, 2013.
Notice of Allowance and Fee(s) Due from U.S. Appl. No. 12/908,821 dated Jul. 19, 2013.
Notice of Allowance and Fee(s) Due from U.S. Appl. No. 13/600,148 dated Jul. 29, 2013.
Non-Final Office Action from U.S. Appl. No. 14/059,325 dated Feb. 24, 2014.
Notice of Allowance and Fee(s) Due from U.S. Appl. No. 14/054,765 dated Mar. 25, 2014.

* cited by examiner

SYSTEMS AND METHODS FOR ROUTING A FACSIMILE CONFIRMATION BASED ON CONTENT

RELATED APPLICATIONS

This application is a continuation of U.S. patent application Ser. No. 11/743,112 filed May 1, 2007, from which priority is claimed and which is herein incorporated by reference.

FIELD OF THE INVENTION

The present invention relates to facsimile systems and methods, and more particularly, this invention relates to systems and methods for routing facsimiles.

BACKGROUND OF THE INVENTION

In the present day, computer systems that were once considered "stand alone" are evolving toward common interconnectivity. At one time, the various computers in an office were all operated individually. Today, the normal business utilizes a network, e.g., a local area network and/or a wide area network, to inter-connect the computers within the enterprise to facilitate work flow among the people who work in the enterprise. Once computerized systems in an office are networked together, it may then become necessary and appropriate to develop tools and methodologies for sharing common resources and for exchanging work files and data, even between modes of communication that were once considered quite distinct.

An example of the once distinct technology now being connected to the modern network and computerized work environment is the technology of facsimile document transmission. Originally, facsimile machines were individual devices which were capable of transmitting what is, in effect, a bit mapped version of a document through defined protocols over a telephone connection to a remote dedicated facsimile device which was capable of reproducing the bit map pattern on paper at the remote station. While stand-alone facsimile devices certainly still exist, it has become common to incorporate a facsimile transmission and reception function into computers and computer networks having other diverse and integrated functions.

Upon receiving a facsimile transmission (fax), a confirmation of receipt may be sent back to the sender of the fax. However, this confirmation has heretofore only been sent to the location from where the fax was sent. This is usually either the contact information of the sender of a fax, e.g. the "sender's number" transmitted concurrently with the fax, or the email address of the sender of an email (and possibly those CC'd).

However, many times this location is not the desired destination for the confirmation of the fax receipt. Furthermore, due to the nature of the fax content it may be desirable to send a fax receipt confirmation to additional locations not explicitly mentioned in any part of the fax transmission.

Therefore, there is a current need for the ability to route a fax confirmation to one or more destinations based on some aspect of the content of the incoming fax message itself.

SUMMARY OF THE INVENTION

A method for routing a confirmation of receipt of a facsimile or portion thereof according to one embodiment of the present invention includes analyzing text of a facsimile for at least one of a meaning and a context of the text; and routing one or more confirmations to one or more destinations based on the analysis.

In one embodiment, the analysis includes determining one or more keywords in the text. In one approach, more than one keyword is determined by the analysis and said keywords are not adjacent in the facsimile text. In another approach, the one or more keywords comprise one or more letters or symbols.

In another embodiment, the facsimile text does not contain confirmation destination information. For instance, the confirmation destination information not contained in the facsimile text includes one or more of names of intended facsimile recipients and destination data.

The analysis may include comparing one or more keywords in the text to other elements in the text. For example, the elements may include words, symbols, keywords, and graphic elements.

The analysis may include matching one or more keywords in the text to data stored in memory. The analysis may include determining the position of one or more keywords in the text. The analysis may include classifying the text as a specific document type. The analysis may include classifying at least one of the keywords in the text as a specific word type.

In one approach, the text is produced by converting the facsimile to a computer-readable format. In another approach, the text is produced by converting a source to text in a human language other than a language of the source.

The confirmation may include: an email message, an audible message, a fax, a text message, a multimedia message, etc.

The confirmation may include a request for additional information.

A method for routing a confirmation according to yet another embodiment of the present invention includes converting a facsimile to a computer-readable document; identifying one or more keywords in the document; analyzing the document by determining at least one of a: relation of one or more words in the document to the one or more keywords, relation of one or more symbols in the document to the one or more keywords, relation of one or more keywords in the document to the one or more other keywords, relation of graphic elements to the one or more keywords, position of the one or more keywords in the document, a classification of the text of the document as a specific document type, a classification of one or more keywords in the document as a specific word type, and text of the one or more keywords; determining a confirmation destination based on the analysis; and routing the confirmation to the facsimile destination based on the determination.

In one approach, multiple facsimile destinations are determined; wherein the facsimile is routed to the multiple destinations. In another approach, the computer-readable document is also routed to the facsimile destination based on the determination.

A method for routing a confirmation of receipt of a facsimile or portion thereof according to yet another embodiment of the present invention includes analyzing a facsimile for at least one of a meaning and a context of the facsimile; attempting to initiate a business process based on the analysis; and routing one or more confirmations relating to the business process to one or more destinations based on the analysis.

In one approach, one of the confirmations is sent upon completion of the business process. In another approach, one of the confirmations is sent upon encountering a problem with the business process.

Systems and computer program products are also presented.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

Figure 1:
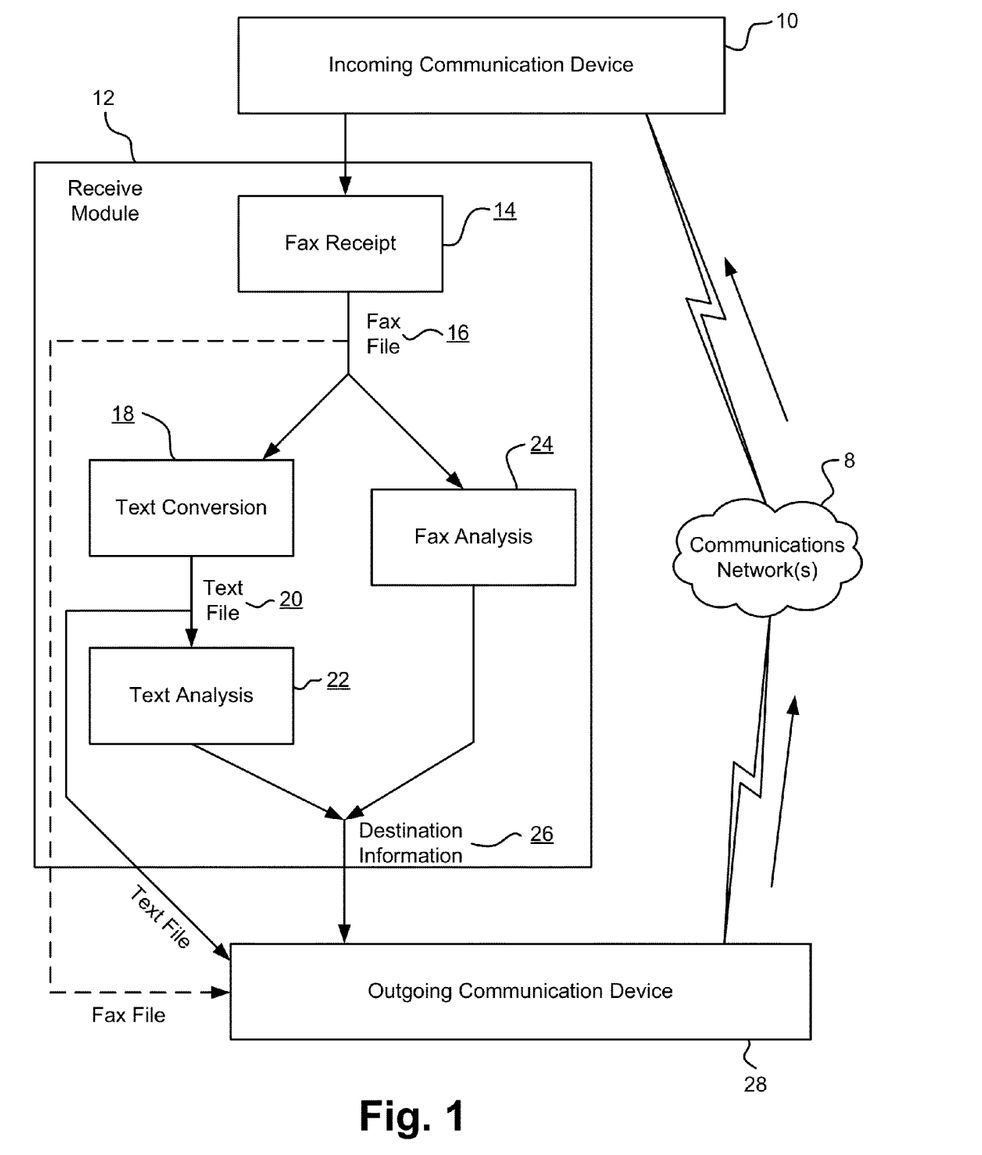
FIG. 1 is a system diagram of a confirmation routing system in accordance with one embodiment of the present invention.

FIG. 1 illustrates a system used to automate confirmation routing via a computerized system upon receipt of a facsimile ("fax"), according to one embodiment. In general, the system determines where to route a confirmation based on one or more features of the received fax and/or its content. A confirmation may be sent to the sender of the original fax. A confirmation may be sent to a person, department or entity other than the sender.

The following modules and/or functions may operate or be performed in conjunction with, exclusive of, or as a supplement to, other routing mechanisms known in the art, such as routing based on a DID number. It should be kept in mind that in practice, an actual system implemented may have more, less or different components that those shown, the embodiment of FIG. 1 being presented by way of example of only one possible configuration.

As shown in FIG. 1, the system includes an incoming communication device 10. Incoming communication device 10 may be coupled to any type of communications network 8, such as a Wide Area Network (WAN, e.g. the Internet), Local Area Network (LAN), Public Switched Telephone Network (PSTN), etc., and combinations thereof. In general, any telecommunication or communication protocol may be used as input to the incoming communication device 10. The incoming communication device 10 may be any communication device which can interface with and receive data. Examples include, but are not limited to, modems, network interface cards (NICs), etc. The incoming communication device 10 can operate at any speed.

The incoming communication device 10 may be coupled to, or be integral with, a receive module 12. Receive module 12 may be any device which manipulates, stores, routes, and/or transmits data in any manner. In one form, receive module 12 can be any computer which comprises one or more of a display screen, a keyboard, a mouse, a processor (e.g., CPU), and a memory unit. In other forms, the receive module 12 may be a microcontroller, a Digital Signal Processor (DSP), a microcontrolling unit, a plurality of microprocessors, a mainframe, a supercomputer, etc. In yet other forms, the receive module 12 is a software module running on a host.

The receive module may have access to memory, the memory being external to it, internal to it, or both. Memory may be comprised of one or more of disk storage, tape storage, magnetic media, non-volatile memory, EPROM memory, EEPROM memory, FLASH memory, DRAM memory, SRAM memory, ROM, CD memory, computer memory, and/or any like memory system or device.

A fax receipt module 14 operates within or in conjunction with receive module 12. Module 14 is generally used to receive data from the incoming communication device 10 and store it as a received fax file 16, e.g., in nonvolatile memory, volatile memory, or both. The received fax file 16 includes information which is received through the incoming communication device 10 and processed by module 14. The information in fax file 16 may be one or more fax transmissions or fax documents received through incoming communication device 10. In one embodiment, the fax receipt module 14 allows the receive module 12 to simulate or "look like" a fax machine to another fax machine coupled to the incoming communication device 10 via the communications network 8. In one embodiment, the fax module 14 is designed to receive fax transmissions. Other transmission forms and protocols may also be supported and recognized by fax receipt module 14 or other modules operating in conjunction therewith, including but not limited to email-based facsimile transmissions, Internet-based facsimile transmissions e.g., from online facsimile services, etc. Fax module 14 may also recognize various fax and coding schemes, such as Huffman encoding, and can be used to communicate at various telecommunication speeds. Also, the fax receipt module 14 may be coded to dynamically and automatically match the transmission speed of the data coming in through the incoming communication device 10. The fax receipt module 14 may have the purpose of receiving one or more fax transmissions through the incoming communication device 10 and processing that fax transmission into a data format stored in the received fax file 16, which can be subsequently processed.

In some cases, faxed transmissions will be received in a short period of time and multiple received fax files 16 will be created. Control code within the receive module 12 may be used to monitor the fax receipt module 14 to ensure data is not lost and that proper management of multiple files is carried out by the receive module 12. The received fax files 16 may optionally be prioritized by time, by a fax transmitting urgency, or other priority criterion.

Once one or more received fax files 16 have been formed via module 14, in one embodiment of the present invention, the fax file 16 may be converted by text conversion module 18 into a computer-readable text document. Optical character recognition (OCR) via a process known in the art is one of many techniques that may be used to process the received fax file 16. If more than one fax file 16 exists within the receive module 12 at one point in time, receive module 12 may determine via the priority scheme discussed above, which received fax file 16 is processed in which order by the text conversion module 18. The primary purpose of the text conversion module 18 is to analyze one or more received fax files 16 and translate those received fax files 16 from a non-text format to a text format. The text format, which is stored at least momentarily in text file 20, may be represented in one of many manners such as ASCII, binary, BCD, etc. In one form, the text conversion module 18 converts only a portion of the received fax file 16 to text, and in another form the text conversion module 18 will convert the entire received fax file 16 to text file 20. In either case, the text conversion module 18 converts the received fax file 16 to a text file 20 for at least one primary purpose. One primary purpose may be to determine from the faxed data any information which is needed to electronically log or track the fax transmission and determine where to properly route the confirmation (e.g., a fax confirmation reply destination).

Once the text conversion module 18 has generated the text file 20, the text of the file is analyzed by a text analysis module 22 for at least one of a meaning and a context of the text. The text of the text file 20 need not contain any confirmation reply information, such as physical addresses, email addresses, fax number, or names of desired recipients, though, if present, such information can be identified and used to determine at least one destination of the confirmation. The analysis performed by the text analysis module 22 can include one or more of the following determinations, in various aspects and permutations of the present invention.

In one approach, one or more keywords are identified in the fax text. These keywords can be comprised of one or more letters or symbols and can be found anywhere in the text of the fax file 16. More than one keyword can be identified in the fax text, and the identified keywords need not be adjacent or in any way related to each other in the fax text. Keywords can be determined based on a wide variety of criteria that best suits the needs of the user. The fax text may be compared to data stored in local or remote memory as part of the keyword identification. For example, a database containing predetermined words of importance may be compared to the fax text, and any matches between the fax text and the predetermined words or their literary derivations (e.g., plural form, tense, etc.) may be identified as keywords.

Once one or more keywords have been determined, an analysis can be performed to determine the meaning and/or context of the document or portion thereof. Any electronics-based method of textual or grammatical parsing or comprehension can be used, including those disclosed herein and others known in the art.

In one approach, the analysis can be based at least in part on the relation of other words in the fax text to the text of the keywords. For example, if one of the identified keywords is "resume," other words can be analyzed in the fax text in order to determine whether the text is in fact a summary of personal qualifications, in which case it would be desirable to send a confirmation of receipt of the document to the sender and/or a hiring department, or is used in its verb form, in which case another person or department might be a more relevant confirmation destination.

Additionally, a determination can be made as to the relation of the one or more keywords to other symbols in the fax text. For example, if one of the identified keywords is "total," "account," "amount," or the like, numeric manipulation symbols in the text, such as the "+," "−," and "=" symbols, can be analyzed in relation to the keyword in order to determine whether the text is related to a relevant department, e.g. accounting, purchasing, or sales, and a confirmation should be sent to such a department as a result.

Furthermore, the relation of one or more keywords to one or more other keywords can be determined. For example, if one of the identified keywords is "amount," and another identified keyword is "due," it is more likely than not that the fax text in question deals with a billing sheet and a confirmation should be sent to the billing department, which is the likely source of the fax. In another example, if one of the identified keywords is "sexual" and another keyword is "harassment," the relation of these two keywords can help determine whether the fax text is a complaint and a confirmation should be sent to human resources or is a spam fax and should be sent to another department.

Also, the relation of one or more graphic elements to one or more other keywords can be determined. For example, if the fax text contains graphic elements in the form of photographs or diagrams, keywords such as "evidence" or "presentation" could be analyzed with respect to the graphic elements in order to determine whether to send the confirmation to the litigation department or the sales department, for example.

The position of one or more of the identified keywords in the document can also be determined. This determination can be used to ascertain the relevance of the identified keyword(s) to the document as a whole. For example, if the word "resume" is found at the top center of a document, it is more likely to be a summary of personal qualifications than if the word is found within the text of a body paragraph in the middle of the fax text.

Additionally, the text of one or more keywords can be determined and analyzed. This text can be self-explanatory, such as an email address, or it can be significant in a way determined by the user. The text of one or more of the determined keywords can also be compared to data stored in memory as part of the analysis. For example, if a keyword contains a format such as "_@_._._," the keyword may be determined to be an email address and may then be analyzed as such. Additionally, keywords that suggest intended confirmation recipients, such as "marketing" or "sales," may be determined and used to assist in routing a confirmation to an intended location. Furthermore, a user may determine that all faxes containing the keyword "Product A" require that a confirmation be routed to the Product A development team as well as the marketing department, and may add such a rule to the system.

During the analysis of the fax text, the fax text itself can be classified as a specific document type. An analysis of one or more elements of the fax text may lead to the fax text being classified as an invoice, resume, etc. For instance, fax text that contains keywords such as "experience" as well as dates, addresses, and contact information may be classified as a "resume" document type and a confirmation should be routed to the hiring department of a company as a result.

In one approach, during the analysis of the fax text, one or more keywords can be classified as a specific word type. Keywords that are indicative of certain types of documents can be classified according to the various possible types of document. For example, a fax text that contains the word "invoice" may be expected to come from a bookkeeping department of an organization, and so a confirmation may be sent to the bookkeeping department of a company identifiable in the facsimile text, e.g., by name, email address, etc. In a variation, several keywords can be classified, and the facsimile is then classified based on the classifications of the keywords.

Many techniques may be used to analyze and classify a fax and/or its text. Possible analysis and classification techniques include, but are not limited to, the use of a naïve Bayes classifier, tf-idf weighting, latent semantic analysis, support vector machines, an artificial neural network, a k-nearest neighbor algorithm, decision trees, and concept mining, etc.

A naive Bayes classifier (also known as Idiot's Bayes) is a simple probabilistic classifier based on applying Bayes' theorem with strong (naive) independence assumptions.

Tf-idf (term frequency-inverse document frequency) weighing is used to evaluate how important a word is to a document in a collection or corpus. The importance increases proportionally to the number of times a word appears in the document but is offset by the frequency of the word in the corpus.

Latent semantic analysis (LSA) uses a term-document occurrence matrix which describes the occurrences of terms in documents. The term-document matrix is a sparse matrix whose rows correspond to documents and whose columns correspond to terms, typically stemmed words that appear in the documents. An example of the weighting of elements of the matrix is tf-idf (term frequency-inverse document frequency): the element of the matrix is proportional to the number of times the terms appear in each document, where rare terms are upweighted to reflect their relative importance. The original occurrence matrix gives the relationship between terms and documents. Latent semantic analysis transforms this into a relationship between the terms and concepts, and a relation between the documents and the same concepts. The terms and documents are now indirectly related through the concepts. LSA is disclosed in greater detail in U.S. Pat. No. 4,839,853, which is herein incorporated by reference.

In particularly preferred approaches, known support vector machine processes are used. Support vector machines (SVMs) are a set of related supervised learning methods used for classification and regression. They belong to a family of generalized linear classifiers. They can also be considered a special case of Tikhonov regularization. A special property of SVMs is that they simultaneously minimize the empirical classification error and maximize the geometric margin. Hence they are also known as the maximum margin classifier.

An artificial neural network (ANN) or commonly just neural network (NN) is an interconnected group of artificial neurons that uses a mathematical model or computational model for information processing based on a connectionist approach to computation. In most cases an ANN is an adaptive system that changes its structure based on external or internal information that flows through the network. In more practical terms neural networks are non-linear statistical data modeling tools. They can be used to model complex relationships between inputs and outputs or to find patterns in data.

The k-nearest neighbor algorithm (k-NN) is a method for classifying objects based on closest training examples in the feature space. The training examples are mapped into multidimensional feature space. The space is partitioned into regions by class labels of the training samples. A point in the space is assigned to the class c if it is the most frequent class label among the k nearest training samples. Usually Euclidean distance is used. The training phase of the algorithm consists only of storing the feature vectors and class labels of the training samples. In the actual classification phase, the same features as before are computed for the test sample (whose class is not known). Distances from the new vector to all stored vectors are computed and k closest samples are selected. The new point is predicted to belong to the most numerous class within the set. The best choice of k depends upon the data; generally, larger values of k reduce the effect of noise on the classification, but make boundaries between classes less distinct. A good k can be selected by parameter optimization using, for example, cross-validation. The special case where the class is predicted to be the class of the closest training sample (i.e. when k=1) is called the nearest neighbor algorithm.

A decision tree is a decision support tool that generally refers to a graph or model of decisions and their possible consequences, including chance event outcomes, resource costs, and utility. A decision tree is a decision support tool, used to identify the strategy most likely to reach a goal. Another use of trees is as a descriptive means for calculating conditional probabilities.

Concept mining describes the discipline of extracting information from a document, such as an auto generated precis, or a subject classification, using the concepts in a document.

It is important to note that the facsimile need not necessarily be converted into a computer-readable text document in order for the facsimile to be routed correctly. In another embodiment of the present invention, a method of non-OCR document identification may be used by fax analysis module 24 to correlate a facsimile pattern to a form, with the routing of the confirmation being based on such a correlation.

For example, a method of analyzing a pattern of light and dark areas of a fax may be used in order to correlate the fax pattern to a form. After a pattern of light and dark areas of a fax are obtained, one or more document features are then determined from the pattern. One or more of these document features may then be analyzed in order to determine a confirmation destination using one or more of the following techniques.

In one approach, one or more of the document features may be compared to one or more features of a form. The form used in the comparison relates to one or more known document types. In another approach, the position of one or more of the document features within the fax pattern may be determined. In yet another approach, one or more of the document features may be compared to other features of the pattern. Combinations of these may also be used.

U.S. Pat. No. 5,159,667, incorporated herein by reference, describes systems and methods for document identification by characteristics matching, which may also be used in one or more of the various embodiments. The systems and methods described therein use the technique of recognition of global document features compared to a knowledge base of known document types. The system first segments the digitized image of a document into physical and logical areas of significance and attempts to label these areas by determining the type of information they contain, without using OCR techniques. The system then attempts to match the areas segmented to objects described in the knowledge base. The system labels the areas successfully matched then selects the most probable document type based on the areas found within the document. Using computer learning methods, the system is capable of improving its knowledge of the documents it is supposed to recognize, by dynamically modifying the characteristics of its knowledge base thus sharpening its decision making capability.

Once the destination is determined, the confirmation is routed to the destination. As in all embodiments, the confirmation may be routed to multiple destinations.

One example of the above method can be found in the use of characteristics matching of a fax document. The technique of characteristics matching involves the recognition of global document features compared to a knowledge base of known document types. The system first segments the digitized image of a document into physical and logical areas of significance and attempts to label these areas by determining the type of information they contain, without using OCR techniques.

The system then may attempt to match the areas segmented to objects described in a knowledge base, for example object data stored and classified in a database. The document knowledge base contains structured information relating to various classes of documents and the objects they each contain. This knowledge base provides the system with the expected structure and content of the documents which may be identified by the system.

For each segmented area on the document an object label may be assigned to the area by matching its structural characteristic, i.e., the physical location of the area on the document, and its relational characteristic, i.e., its location with respect all the other areas on the document, against the expected physical and relational characteristics provided by the knowledge base. As a result of this matching process, a table of evidence and disevidence is built for each area as containing a particular object. Based on the evidence and disevidence table, proposed object labels are assigned to the segment areas and a proposed classification designation is assigned to the document.

The module then begins a verification pass through the document. Using the proposed object labels and document classification, the structural and relational characteristics of the areas are again compared. If the results of the second-pass is the same as the first-pass, the object labels and document classification are considered verified. If the results are different, new labels are proposed and the verification step is repeated. After successful verification, the system then begins another pass to attempt to match further document characteristics in order to identify a possible sub-class of the document within the selected document class. Once the document class and possibly its sub-class as well as the objects it contains are adequately classified, this information is stored for later retrieval. The system labels the areas successfully matched then selects the most probable document type based on the areas found within the document. Using computer learning methods, the system is capable of improving its knowledge of the documents it is supposed to recognize, by dynamically modifying the characteristics of its knowledge base thus sharpening its decision making capability.

It should be noted that the above analysis examples may be used in conjunction with the use of systems utilizing at least one or more of name, e-mail, and contact information recognition, e.g. other fax routing, data extraction, or document classification systems. Use of the above examples can assist in substantiating the determination of a correct confirmation destination using these types of recognition and can increase the probability of correct delivery to an intended or appropriate recipient of the confirmation.

It should also be noted that a single module may perform the functions of both the text analysis module 22 and the fax analysis module 24, and would therefore be able to receive and analyze both fax files 16 and text files 20. Additionally, both the text analysis module 22 and the fax analysis module 24 may perform analysis on the same fax file 16 through parallel processes. The results of both of these analyses can be compared and used to substantiate the confirmation destination information 26 obtained by both modules and increase the probability of correct delivery.

Based on the analysis of the received fax file 16, a text file 20, fax pattern, etc., confirmation destination information 26 is determined. Destination information 26 may consist of one or more destinations for the confirmation.

Once one the confirmation destination information 26 is determined by the above or any other methods, a confirmation is generated or retrieved from memory/storage, and the confirmation is routed to the proper confirmation destination. Generation/retrieval of the confirmation may be performed by any mechanism. The routing may be done via an outgoing communication device 28.

As noted above, a confirmation may be sent to the sender of the original fax, and/or a person, department or entity other than the sender. The confirmations sent to each party may be identical or different.

A confirmation may be generated each time a fax is received, using methods known in the art. A confirmation may also be retrieved from a database or memory upon receiving a fax. Further, a confirmation template can be retrieved from memory or a database and populated with information about the fax or conditions associated with its receipt.

A confirmation may take many forms, e.g. email, audible messages (e.g., synthesized voice), faxes, text messages such as short message service (SMS) messages, multimedia messages such as multimedia messaging service (MMS) messages, etc.

The content of the confirmation may include items found in standard confirmations, such as a time/date stamp, whether the fax was received successfully or that an error occurred, a number of pages received, etc. Additionally, the confirmation may include a copy of the fax or portion thereof, e.g., first page; intended recipient; list of recipients of the confirmation; data extracted from the fax; etc.

It should also be noted that the actual content of the confirmation is intended to extend beyond mere confirmation of some event such as successful or unsuccessful receipt of a fax. Particularly, any type of information relating to successful, unsuccessful, or delayed receipt and/or delivery of the fax can be included in the confirmation. For example, the confirmation may indicate that an exception has occurred, as where the incoming fax did not contain sufficient information to be routed to its intended destination, the routing information contained therein is wrong, etc.

The confirmation may also ask the sender for additional information, such as complementary information, security information, clarification, etc. In the various approaches, the additional information may be requested in real-time (e.g., by voice) or semi real-time (by email, by reply fax, etc.). The additional information may be returned by the sender in any of the forms presented herein, and may optionally be joined to the original fax message.

In another exemplary embodiment, the confirmation may indicate that an irregularity has been detected, and may request further action. For example, the document analyzer may detect that the document is unreadable or blank, upon which a request is sent to the sender indicating this, and possibly a request to resend the document.

Further, the confirmation may include an alert, such as informing the sender that the fax was sent beyond a pre-defined deadline.

Examples of an outgoing communication device include an electronic mail program, a fax machine, etc. The proper confirmation destination may be identified by the outgoing communication device 28 via an address, a user name, a numerical value, a network identifier, or any like identification means which can be found or identified via one or more of text analysis 22, fax analysis 24, and outgoing communication device 28.

Outgoing communication device 28 may be coupled to any communications network 8, e.g. the Internet, PSTN, etc., and can communicate across telecommunication lines, local area networks, token passing networks, computer interfaces, parallel computer interfaces, buses, or any like computer communication means to transmit the information received by incoming communication device 10 to the confirmation destinations identified by the text analysis 22, the fax analysis 24, or both. Accordingly, the confirmation may be sent in the form of a facsimile, email, audible message, etc. Additionally, if the text conversion module 18 has been used to generate a text file 20, the text file 20 may also be routed to the selected confirmation destination.

Additionally, in one embodiment the incoming communication device 10 and the outgoing communication device 28 may be the same device coupled to the receive module 12 and would therefore be able to both receive incoming fax information as well as transmit outgoing fax information.

In a preferred form, more than one destination is operatively coupled to the outgoing communication device 28, e.g., via network, PSTN, etc. It is important to note that any number N of destinations, computers, users, etc. can be coupled to the outgoing communication device 28 via the office network wherein N is a finite positive integer. In addition, the end user may not always be a computer, but may be a specific folder, directory, or disk area on a computer, a default computer, a disk drive/tape drive, a computer screen, a printer, a fax machine, a cell phone, etc.

In one example, the receive module 12 will interact with one or more of incoming communication device 10, text conversion module 18, text analysis module 22, fax analysis module 24, and outgoing communication device 28 to coordinate the execution of these modules and to record information regarding the processes performed by the system. For example, receive module 12 can prioritize, memory manage, and garage collect received fax files 16 as they are processed by module 18, module 22, and module 24. In addition, the receive module 12 can communicate with the text analysis 22, the fax analysis 24, and the outgoing communication device 28 to store fax receipt times, processing errors, information regarding confirmation destination identification, and time of transmission along the office network.

Since the receive module 12 may function as a coordinator for the entire system illustrated in FIG. 1, the receive module may contain valuable information as to the receipt and transmission of faxed documents. This information can be stored in a log file for subsequent reference and future use. The log file is generated by the receive module 12 and may have optional or required (depending upon a system set-up) entries for each fax received by the incoming communication device 10 and processed by the computer 12. It is important to note that some fax receipts may be intended for logging, while other fax receipts or transmissions may be indicated as transmissions which should not be logged in another form. In some cases, the fax transmission will be logged so that the receipt and routing of the fax can be determined at a later date.

The log file may contain, per fax, information such as the time and date of receipt by the fax receipt module 14, the time of the generation of fax file 16, any complications or information regarding the text conversion module 16, the time the text file 20 was generated, the confirmation destinations determined by the text analysis 22 or the fax analysis 24, the time and destinations transmitted by the outgoing communication device 28, user information from, number of pages received per faxed transmission, the sender of the fax, phone numbers, addresses, and any other information which could be regarded as useful to a facsimile user or sender.

In some cases, either the text conversion module 18 will not properly convert the received faxed file 16, or the text analysis 22 will not be able to determine a viable confirmation destination. In these cases, the outgoing communication device may route one or more of the fax file, the text file 20, and a confirmation to a default confirmation destination. In another form, the confirmation can simply be printed via a hardware printer and routed by hand via human personnel or stored to a default disk space.

The destination of the facsimile may also be determined using minor variations of the methodology presented above. Therefore, the fax and text file can be sent to the proper destinations, at about the same time as the confirmation.

The system illustrated in FIG. 1 may have several advantages in each of the various embodiments and permutations thereof. One potential advantage is that the system of FIG. 1 may be used as a scanner. The scanner function of FIG. 1 is discussed as follows. If a fax machine is coupled to the fax incoming communication device 10 of FIG. 1, then a user can fax a paper document to himself/herself. This faxed paper document is received by the incoming communication device 10 from the fax machine and processed by text conversion module 18 to a text file 20. This file 20 is subsequently mailed to the location indicated by the confirmation destination information obtained from the text file 20 by the text analysis module 22. Therefore, if one were to fax himself a document through the system in FIG. 1, that document would be sent to his/her computer destination as a text file 20 or image file and not necessarily on paper. Therefore, fax or paper documents can be converted to text computer formats which can be edited and changed by a user coupled to the system.

In addition, the man hours required to keep track of one or more fax machines by secretaries and/or support staff is very time consuming. By using the system illustrated in FIG. 1, man hours required to log and route faxes, especially those not containing explicit confirmation destination location information in the cover sheet or text of the fax itself, are significantly reduced compared to the prior art. Prior art fax machines operate by printing out a document received on a communication line and leaving the document for a human user to pick up and distribute. This technique is not secure, due to the fact that any user can grab the printed copy off of the fax machine and mis-route, steal, or illegally access the material transmitted. The system of FIG. 1 ensures a higher level of security since only those destined to receive the confirmation are those with access to the fax, since computer security measures typically exist to prevent others from logging into many intended confirmation destination locations. In addition, the intended confirmation destination locations may contain a large amount to security software to avoid viruses and unauthorized access. To enhance security, the system may not send a confirmation if a "receipt confirmation request" box is not checked, or if a "no confirmation" box is checked on the facsimile.

When a fax is printed on paper in a prior art fax, the faxes need to be routed by human personnel and may be lost, routed late, or routed incorrectly. Once lost, routed incorrectly, or routed late, the fax can usually not be regained and resubmitted to its final destination. The system of FIG. 1 prevents this loss by storing the received fax permanently on disk or a like media and ensures that the fax will be routed to an end user in a timely, efficient, and secure manner. In addition, the system of FIG. 1 ensures extensive and proper logging of the receipt and communication of fax files without extensive human interaction. In many cases, faxes are transmitted to communicate routine information between offices and is not required to be on printed paper for storage. Therefore, the system of FIG. 1 is environmentally sound in that it saves paper when a fax need not be recorded on paper and only viewed by a user on a computer screen.

It is important to note that the outgoing communication device 28 can route not only the confirmation but one or more of either the text file 20 or the received fax file 16 depending upon conditions set within the receive module 12. In some cases, a sender will want the end user coupled to outgoing communication device 28 not to have textual access to his file so that the file cannot be changed or edited in an easy manner. In another form, the sender may wish to have the end user change the facsimile or edit the facsimile, in which case the text file 20 is communicated by the outgoing communication device 28. In many cases, the text file 20 can be E-mail transmitted in a much faster time than any received file. It is also important to note that the text conversion module 18 can use one or more of any known techniques to recognize not only computer-generated cover sheets comprising senders and confirmation destinations, but senders and confirmation destinations written by hand on a cover sheet of a facsimile document. In addition, translation software which translates a document from one language to another (e.g. Japanese to English or vice versa) may be incorporated into the text conversion module 18 or may be added as a new module. The text conversion module 18 can then recognize and translate facsimile senders, confirmation destinations, and text from foreign languages to English (and vice versa) so that a recipient and sender need not speak the same language.

It is important to note that the fax receipt module 14, text conversion module 18, text analysis module 22, fax analysis module 24, and outgoing communication device 28 may be "pipelined" in order to achieve greater throughput of faxes through the system. For example, a first fax may be in the process of being received by the fax receipt module 14 or may be in the process of being written to a fax file 16, while a second fax is being converted via the text conversion module 18 to a text file 20, while a third fax is being analyzed via text analysis module 20, fax analysis module 24, or both, while a fourth fax is being routed via the outgoing communication device 28. This technique will also ensure that one slow software portion within the system does not entirely slow the entire fax receiving process. For example, if the fax receipt module 14 can receive faxes faster than the text conversion module can convert faxes, then the fax receipt module 14 can stack or queue received fax files 16 and not slow receipt of faxes through the incoming communication device 10. In another form, if a "bottleneck" is found wherein one of the modules 14, 18, 22, 24, or 28 is slowing the process, this slower program may be augmented by adding similar processing capability in parallel to the slow program to improve throughput (i.e. parallel software processing).

Note that regardless of the speed of the system, the confirmation might be sent some time after the fax was received, such as in the situation where the destination number is continuously busy for a long period of time, where the destination of the fax is determined based on a context or content of a fax, etc.

Further, there may also be situations where transmission of the confirmation may be delayed intentionally.

Figure 2:
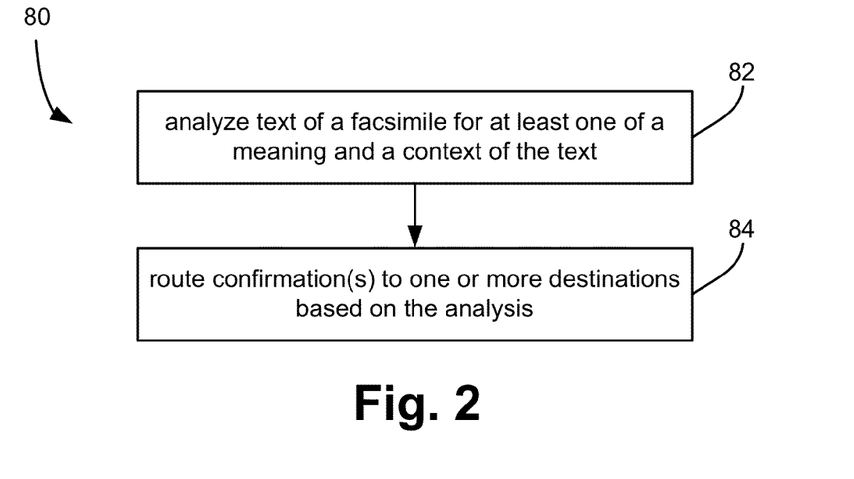
FIG. 2 is a flow diagram of a process for routing a confirmation in accordance with one embodiment of the present invention.

FIG. 2 illustrates a method 80 for routing a confirmation according to one embodiment. In operation 82, text of a facsimile is analyzed for at least one of a meaning and a context of the text. In operation 84, one or more confirmations are routed to one or more destinations based on the analysis.

Figure 3:
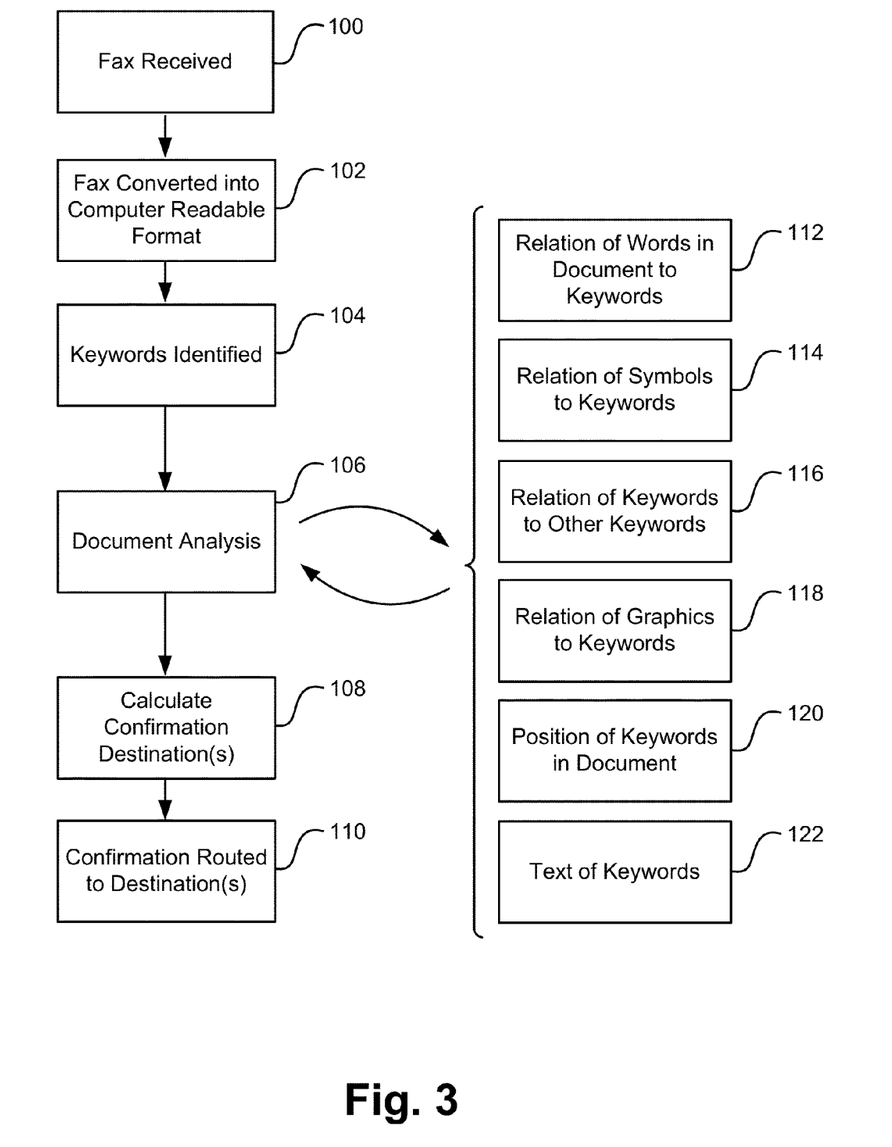
FIG. 3 illustrates, in a flowchart, a process performed by a confirmation routing system in accordance with one embodiment of the present invention.

FIG. 3 illustrates the operation of a system according to one embodiment of the present invention. In step 100, the fax is received. In step 102 the received fax is converted into a computer-readable document. In step 104 one or more keywords are identified in the computer-readable document. In step 106 document analysis is performed. Document analysis includes at least one of the following: determining the relation of one or more words in the document to one or more keywords in the document in 112, determining the relation of one or more symbols in the document to the one or more keywords in 114, determining the relation of one or more keywords in the document to the one or more other keywords in the document in 116, determining the relation of graphic elements in the document to the one or more keywords in the document in 118, determining the position of one or more keywords in the document in 120, and determining the significance of one or more of the keywords in 122.

Once document analysis 106 has been performed, one or more confirmation destinations for the confirmation are calculated based on the analysis 106. The confirmation is then routed to one or more confirmation destinations in 110.

Figure 4:
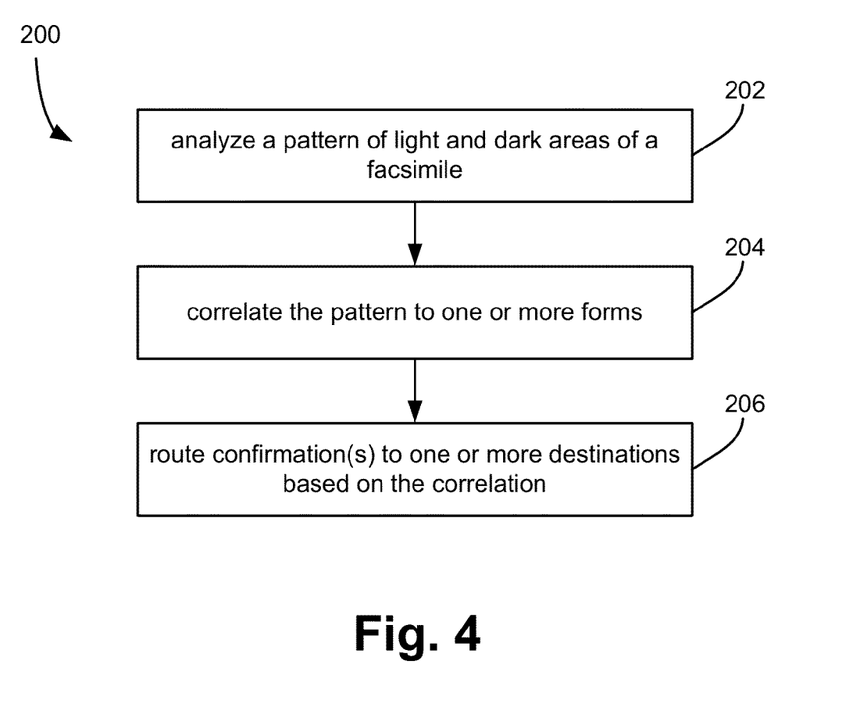
FIG. 4 is a flow diagram of a process for routing a confirmation in accordance with one embodiment of the present invention.

FIG. 4 depicts a method 200 for routing a confirmation according to another embodiment. In operation 202, a pattern of light and dark areas of a facsimile is analyzed. In operation 204, the pattern is correlated to one or more forms, In operation 206, one or more confirmations are routed to one or more destinations based on the correlation.

Figure 5:
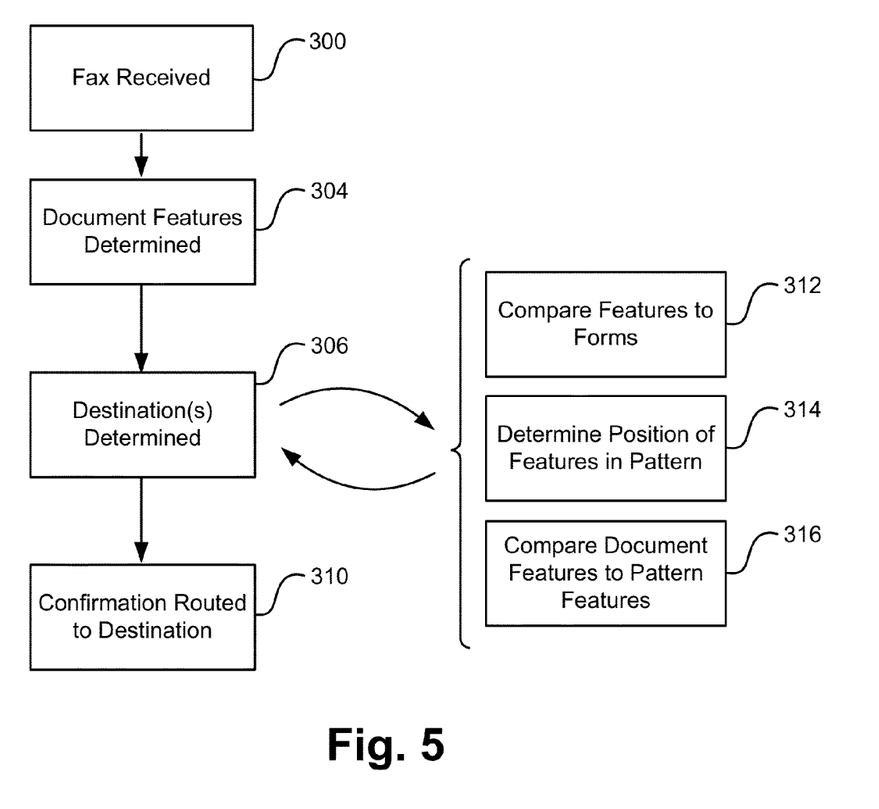
FIG. 5 illustrates, in a flowchart, a process performed by a confirmation routing system in accordance with another embodiment of the present invention.

FIG. 5 illustrates a flow chart which describes the operation of a system in one embodiment of the present invention. In step 300, the fax, which contains a pattern of light and dark areas, is received. In step 304 document features are determined for the received fax. In step 306 one or more destinations of the confirmation is calculated. Calculating one or more destinations of the confirmation may include one or more of the following: comparing the one or more document features to features of one or more forms, where the forms relate to one or more of a certain document type, in 312, determining the position of one or more of the document features within the pattern of light and dark areas in 314, and comparing at least one of the document features to other features of the pattern of light and dark areas in 316. Once one or more confirmation destinations have been determined in 306, the confirmation is routed to one or more confirmation destinations in 310.

In a further embodiment, a fax is received and used to start, or attempt to start, a business process. The meaning and/or context of the fax may be determined as above, and used to select the appropriate process to initiate. Such a process may be machine implemented, human implemented, or a combination of the two. When the business process is initiated and/or completes, a confirmation is sent back to the original document sender. For example, assume someone sends in an invoice. The fax is recognized as an invoice, which triggers initiation of an AP (accounts payable) process. A notification may be sent to the sender indicating that the invoice is being processed. When the invoice has been processed and payment is made, a notification may be sent to the invoice sender.

In the event that there is a problem with the business process, an exception may be generated and the original document sender is notified of the problem. This might occur in the invoice example above, for example, where products that are being invoiced haven't been delivered yet, if the AP process cannot be initiated for some reason, etc.

While the present invention has been illustrated and described with reference to specific embodiments, further modification and improvements will occur to those skilled in the art. For example, "code", as used herein, or "module", as used herein, is any plurality of binary values or any executable, interpreted or compiled code which can be used by a computer or execution device to perform a task. This code or module can be written in any one of several known computer languages. A "module," as used herein, can also mean any device which stores, processes, routes, manipulates, or performs like operation on data. An "incoming communication device" and "outgoing communication device" may be any communication devices which can be used for taking fax information and inputting the fax information into a module. A "text file" or "textual format", as used herein, may be any data format for efficiently storing alphanumerical data. In general, a text file or text format is any data structure which identifies individual alphanumeric characters letters, or language characters from any faxed transmission. A "string", as used herein, is one or more alpha numeric or textual characters which are identified as being part of a group (such as a human name). The confirmation destinations herein may be any type of computer or other destination which may not necessarily require display devices, user input devices, or memory. For example, an end-user or destination may simply be a disk drive, a paper-based facsimile machine, or a telephone. It is to be understood, therefore, that this invention is not limited to the particular forms illustrated and that it is intended in the appended claims to cover all possible modifications of the teachings herein.

The present description is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a LAN, a WAN, a PSTN or other means of communication. In addition, various combinations of wired, wireless (e.g., radio frequency) and optical communication links may be utilized.

The program environment in which a present embodiment of the invention is executed illustratively incorporates one or more general-purpose computers or special-purpose devices such facsimile machines and hand-held computers. Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

Figure 6:
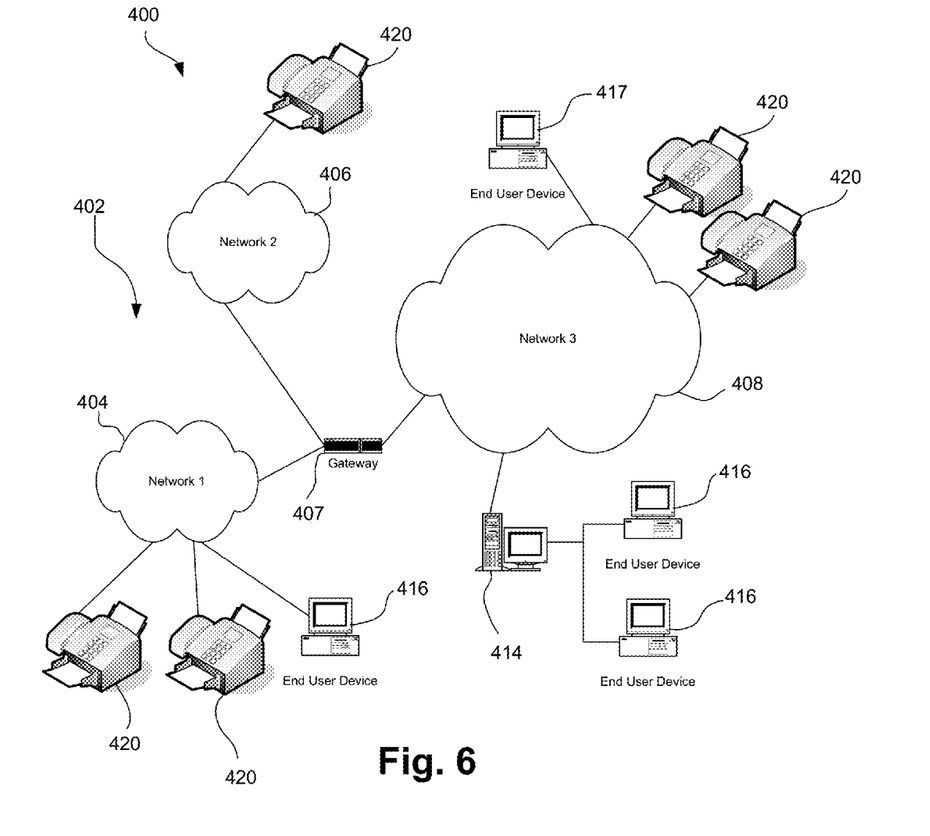
FIG. 6 is a network diagram illustrating a network architecture in which the various embodiments described herein may be implemented.

FIG. 6 illustrates a network architecture 400, in accordance with one embodiment. As shown, a plurality of remote networks 402 are provided including a first remote network 404 and a second remote network 406. A gateway 407 may be coupled between the remote networks 402 and a proximate network 408. In the context of the present network architecture 400, the networks 404, 406 may each take any form including, but not limited to a LAN, a WAN such as the Internet, PSTN, internal telephone network, etc.

In use, the gateway 407 serves as an entrance point from the remote networks 402 to the proximate network 408. As such, the gateway 407 may function as a router, which is capable of directing a given packet of data that arrives at the gateway 407, and a switch, which furnishes the actual path in and out of the gateway 407 for a given packet.

Further included is at least one data server 414 coupled to the proximate network 408, and which is accessible from the remote networks 402 via the gateway 407. It should be noted that the data server(s) 414 may include any type of computing device/groupware. Coupled to each data server 414 is a plurality of user devices 416. Such user devices 416 may include a desktop computer, lap-top computer, hand-held computer, printer or any other type of logic. It should be noted that a user device 417 may also be directly coupled to any of the networks, in one embodiment. A facsimile machine 420 or series of facsimile machines 420 may be coupled to one or more of the networks 404, 406, 408.

It should be noted that databases and/or additional components may be utilized with, or integrated into, any type of network element coupled to the networks 404, 406, 408. In the context of the present description, a network element may refer to any component of a network.

Figure 7:
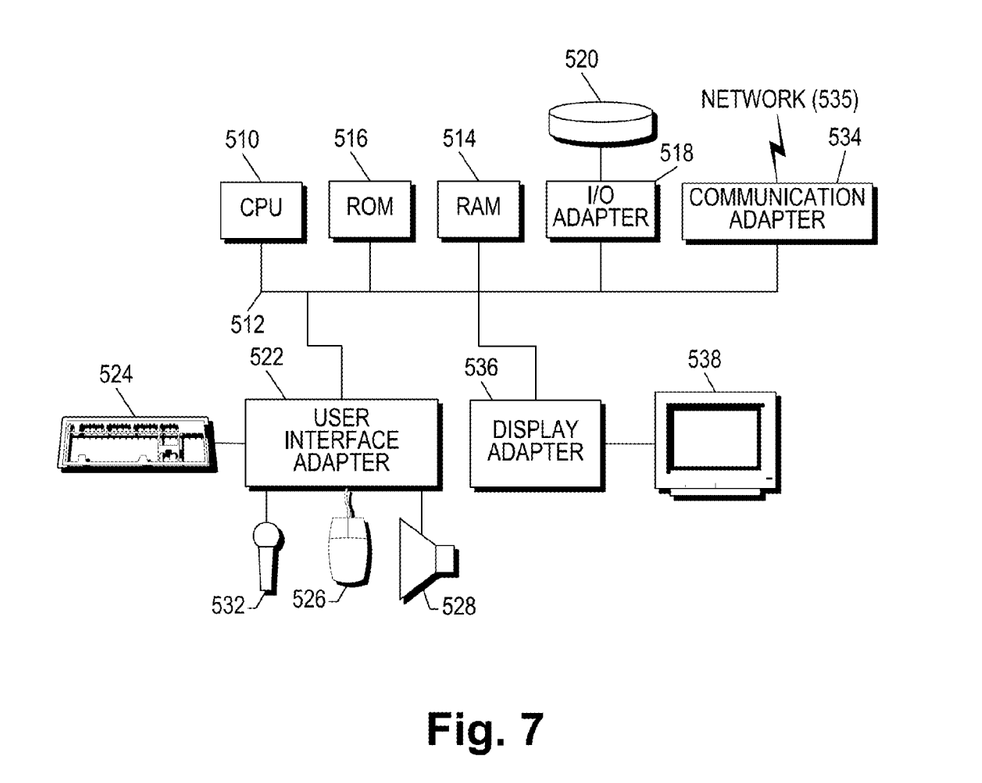
FIG. 7 is a system diagram of a representative hardware environment associated with a user device.

FIG. 7 shows a representative hardware environment associated with a user device 416 of FIG. 6, in accordance with one embodiment. Such figure illustrates a typical hardware configuration of a workstation having a central processing unit 510, such as a microprocessor, and a number of other units interconnected via a system bus 512.

The workstation shown in FIG. 7 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen and a digital camera (not shown) to the bus 512, communication adapter 534 for connecting the workstation to a communication network 535 (e.g., a data processing network) and a display adapter 536 for connecting the bus 512 to a display device 538.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for routing a confirmation of receipt of a facsimile or portion thereof, comprising:
    analyzing text of a facsimile for at least one of a meaning and a context of the text;
    recognizing one or more global document features of the facsimile based at least in part on the analysis;
    comparing at least one recognized global document feature in the facsimile to a plurality of known document types;
    routing one or more confirmations to one or more destinations based at least in part on the analysis and the comparison; and
    determining a type of information contained within each physical area of significance and each logical area of significance;
    wherein the global document features comprise physical areas of significance and logical areas of significance, and
    wherein the determining does not utilize any OCR techniques.

2. A method as recited in claim 1, wherein the analysis includes determining one or more keywords in the text,
    wherein more than one keyword is determined by the analysis and said keywords are not adjacent in the facsimile text, and
    wherein each of the keywords comprise one or more letters or symbols.

3. A method as recited in claim 1, further comprising labeling at least some of the physical areas of significance and the logical areas of significance.

4. A method as recited in claim 1, wherein the facsimile text does not contain confirmation destination information, and
    wherein the confirmation destination information not contained in the facsimile text includes one or more of names of intended facsimile recipients and destination data.

5. A method as recited in claim 1, wherein the analysis includes comparing one or more keywords in the text to other elements in the text, and wherein the elements include words, symbols, keywords, and graphic elements.

6. A method as recited in claim 1, wherein the analysis includes:
    matching one or more keywords in the text to data stored in memory; and
    determining a position of one or more keywords in the text.

7. A method as recited in claim 1, further comprising determining a position of one or more of the global document features.

8. A method as recited in claim 1, wherein the analysis includes classifying the text as a specific document type.

9. A method as recited in claim 2, wherein the analysis includes classifying at least one of the keywords in the text as a specific word type.

10. A method as recited in claim 1, further comprising:
    digitizing the facsimile;
    segmenting the digitized facsimile into areas, each area comprising one or more of the recognized global document features; and
    matching one or more of the areas to one or more objects described in a knowledge base.

11. A method as recited in claim 10, further comprising labeling at least one of the matched areas based on a type of information contained in the matched area.

12. A method as recited in claim 1, wherein the text is produced by converting a source to text in a human language other than a language of the source.

13. A method as recited in claim 1, wherein the confirmation is selected from a group consisting of an audible message, a flux, a text message, and a multimedia message.

14. A method as recited in claim 1, further comprising dynamically modifying one or more characteristics of a knowledge base,
    wherein the each of the plurality of known document types is described by one or more of the characteristics.

15. A method as recited in claim 1 wherein the confirmation is routed to a sender of the facsimile as well as a destination other than one associated with a sender of the facsimile.

16. A method as recited in claim 1, wherein the each of the known document types corresponds to one of a plurality of document classes, at least one document class further comprising a plurality of document sub-classes.

17. A method as recited in claim 16, wherein the global document features comprise physical areas of significance and logical areas of significance, the method further comprising:
    classifying the facsimile according to one of the plurality of document classes;
    verifying the classification of the facsimile based on at least one of:
        structural characteristics of one or more of the areas; and
        relational characteristics of one or more of the areas, and
    classifying the facsimile according to one of the document sub-classes.

18. A method as recited in claim 1, wherein the facsimile text does not contain confirmation destination information, wherein the analysis includes classifying the text as a specific document type, and wherein the text is produced by converting a source to text in a human language other than a language of the source.

19. A method as recited in claim 1, wherein the facsimile text does not contain confirmation destination information, wherein the analysis includes classifying the text as a specific document type, and wherein the confirmation is routed to a sender of the facsimile as well as a destination other than destinations associated with a sender and an intended recipient of the facsimile.

20. A system for routing a confirmation of receipt of a facsimile or portion thereof, comprising:
    a memory; and
    a processor in communication with the memory, the processor being configured for performing the method of claim 1.

21. A system for routing a confirmation of receipt of a facsimile or portion thereof, comprising:

a memory storing logic for performing the method of claim 1; and a processor in communication with the memory, the processor being configured for executing the logic.

22. A method for routing a confirmation, comprising:
converting a facsimile to a computer-readable document;
identifying one or more keywords in the document;
analyzing the document by determining at least two of a:
   relation of one or more symbols in the document to the one or more keywords,
   relation of graphic elements to the one or more keywords, and
   classification of text of the document as a specific document type,
determining a confirmation destination based on the analysis; and
routing the confirmation to the confirmation destination based on the determination,
wherein the determining does not utilize any OCR techniques.

23. A system for routing ac comprising:
a processor for executing logic;
logic for converting a facsimile to a computer-readable document;
logic for identifying one or more keywords in the document;
logic for analyzing the document by determining at least two of a
   relation of one or more symbols in the document to the one or more keywords,
   relation of graphic elements to the one or more keywords, and
   classification of text of the document as a specific document type,
logic for determining a confirmation destination based on the analysis; and
logic for routing the facsimile to the confirmation destination based on the determination,
wherein the determining does not utilize any OCR techniques.

24. A computer program product for routing a confirmation of receipt of a facsimile or portion thereof, the computer program product comprising:
   a non-transitory computer readable medium having computer code thereon, including:
   computer code for converting a facsimile to a computer-readable document;
   computer code for identifying one or more keywords in the document;
   computer code for analyzing the document by determining at least two one of a:
      relation of one or more symbols in the document to the one or more keywords,
      relation of graphic elements to the one or more keywords, and
      classification of text of the document as a specific document type,
   computer code for determining a confirmation destination based on the analysis; and
   computer code for routing the confirmation to the confirmation destination based on the determination,
   wherein the determining does not utilize any OCR techniques.

25. A method for routing a confirmation of receipt of a facsimile or portion thereof, comprising:
analyzing a facsimile for at least one of a meaning and a context of the facsimile;
segmenting the facsimile into areas;
matching at least some of the areas to one or more of:
   a structural characteristic of one or more known document types; and
   a relational characteristic of one or more known document types;
labeling each matched area based on the matching, the labeling further comprising compiling evidence and disevidence for one or more of the areas;
attempting to initiate a business process based on the analysis; and
routing one or more confirmations relating to the business process to one or more destinations based on the analysis,
wherein the evidence and the disevidence each relate to whether the area contains a particular object corresponding one or more of the labels
wherein one of the confirmations is sent upon either completion of the business process or upon encountering a problem with the business process.

26. A system for routing a confirmation of receipt of a facsimile or portion thereof, comprising:
a memory; and
a processor in communication with the memory, the processor being configured for performing the method of claim 25.

27. A system for routing a confirmation of receipt of a facsimile or portion thereof, comprising:
a memory storing logic for performing the method of claim 25; and
a processor in communication with the memory, the processor being configured for executing the logic.

28. A computer program product for routing a confirmation of receipt of a facsimile or portion thereof, the computer program product comprising:
   a non-transitory computer readable medium having computer code thereon, including:
   computer code for analyzing a facsimile for at least one of a meaning and a context of the facsimile;
   computer code for labeling one or more areas of the facsimile based on the analysis;
   computer code for classifying the facsimile as a particular document type based on one or more of the analysis and the labeling;
   computer code for attempting to initiate a business process based on the analysis;
   computer code for routing one or more confirmations relating to the business process to one or more destinations based on the analysis;
   computer code for digitizing the facsimile;
   computer code for segmenting the digitized facsimile into areas, each area comprising one or more of the recognized global document features; and
   computer code for matching one or more of the areas to one or more objects described in a knowledge base; and
   computer code for labeling at least one of the matched areas based on a type of information contained in the matched area,
   wherein the computer code for segmenting does not utilize any OCR techniques.

29. The computer program product in claim 28, further comprising computer code for verifying the classification.

\* \* \* \* \*

UNITED STATES PATENT AND TRADEMARK OFFICE
CERTIFICATE OF CORRECTION

| | | |
|---|---|---|
| PATENT NO. | : 8,804,178 B2 | Page 1 of 1 |
| APPLICATION NO. | : 13/776541 | |
| DATED | : August 12, 2014 | |
| INVENTOR(S) | : Borrey et al. | |

It is certified that error appears in the above-identified patent and that said Letters Patent is hereby corrected as shown below:

In the claims:

col. 18, line 21 replace "flux," with --fax,--.

Signed and Sealed this
Twenty-fifth Day of November, 2014

Michelle K. Lee
*Deputy Director of the United States Patent and Trademark Office*